E. T. BASKIN.
GLOVE.
APPLICATION FILED FEB. 15, 1915.
Reissued Dec. 7, 1915. 14,025.
2 SHEETS—SHEET 1.
Fig. I.
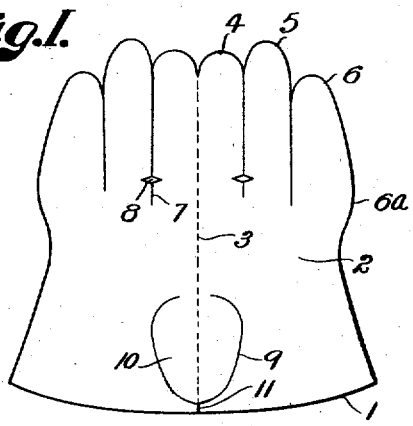
Fig. II.
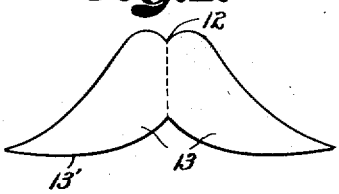
Fig. III.
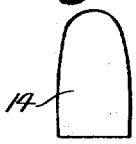
Fig. V.
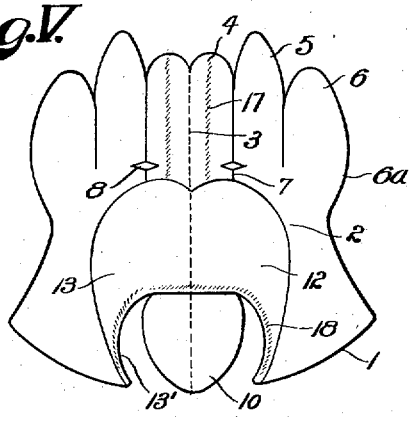
Fig. IV.
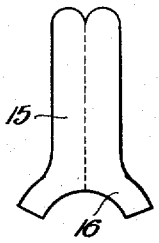
Fig. VI.
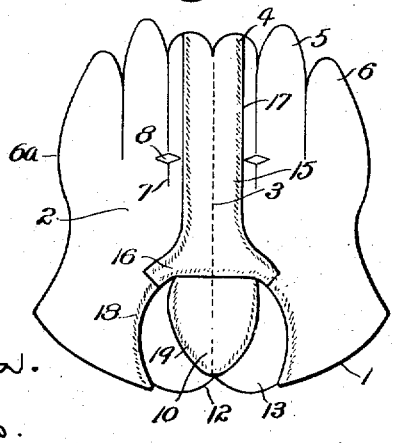
WITNESSES:
Lynn A. Robinson.
Leta E. Coats.
INVENTOR
E. T. Baskin.
BY
Arthur C. Brown.
ATTORNEY
COLUMBIA PLANOGRAPH CO., WASHINGTON, D. C.

E. T. BASKIN.
GLOVE.
APPLICATION FILED FEB. 15, 1915.
Reissued Dec. 7, 1915.
14,025.
2 SHEETS—SHEET 2.
Fig. VII.
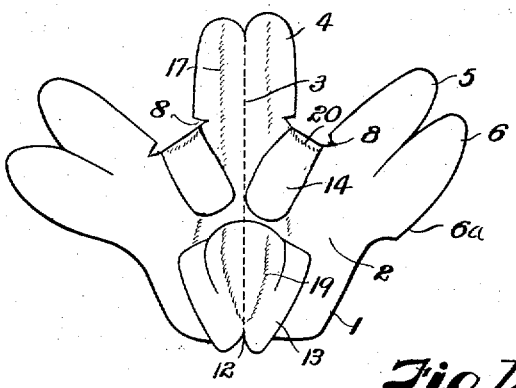
Fig. VIII.
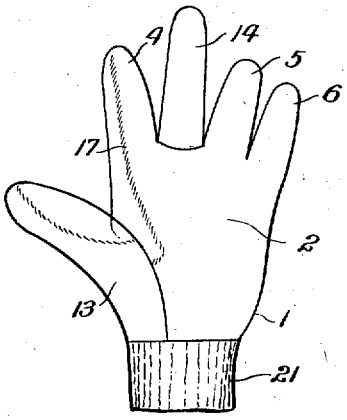
Fig. IX.
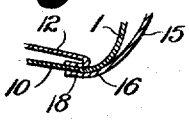
WITNESSES:
Lynn A. Robinson.
Leta E. Coats.
INVENTOR
E. T. Baskin.
BY
Arthur C. Brown.
ATTORNEY
COLUMBIA PLANOGRAPH CO., WASHINGTON, D. C.

UNITED STATES PATENT OFFICE.

EDWIN T. BASKIN, OF INDEPENDENCE, MISSOURI.

GLOVE.

14,025. Specification of Reissued Letters Patent. Reissued Dec. 7, 1915.

Original No. 1,109,102, dated September 1, 1914, Serial No. 793,044. Application for reissue filed February 15, 1915. Serial No. 8,410.

*To all whom it may concern:*

Be it known that I, EDWIN T. BASKIN, a citizen of the United States, residing at Independence, in the county of Jackson and State of Missouri, have invented certain new and useful Improvements in Gloves; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The present invention appertains to gloves, and aims to provide a glove of novel or unique construction, the present invention being particularly an improvement over the gloves and mittens disclosed in my former Patent No. 1,072,560, issued September 9, 1913, and in my copending applications, Serial No. 677,941 and 716,085, filed February 16, 1912, and August 20, 1912, respectively.

It is the object of the present invention to provide a glove of novel construction, as over prevailing gloves, whereby the improved glove will have a minimum amount of stitching, and in order that the seams will be less exposed to wear than heretofore.

A specific object of the present invention is to provide a body blank of the nature indicated, in connection with a thumb pocket formed of a blank, and stitched to the body in connection with a lining or facing for the index finger, in a peculiar manner, the body blank having a thumb lap or facing which is stitched to the interior of the thumb pocket blank whereby the quirk will be of peculiar reinforced construction.

With the foregoing and other objects in view which will be apparent as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein:

Figure I is a plan view of the body blank of the glove. Fig. II is a plan view of the thumb pocket blank. Fig. III is a plan view of one of the independent finger pocket sections. Fig. IV is a plan view of the lining or facing blank for the index finger. Fig. V is a similar view to Fig. I illustrating the index finger lining or facing and thumb pocket blank stitched to the body blank. Fig. VI is a view taken from the opposite side of the body blank, as seen in Figs. I and V, the thumb pocket blank being folded downward, and the thumb lap of facing of the body blank being sewed to the thumb pocket blank. Fig. VII is a view illustrating the manner of sewing the independent finger pocket sections to the body blank between the index and third finger sections. Fig. VIII is an elevation of the completed glove. Fig. IX is a section detail taken through the quirk.

The blanks from which the present glove is constructed are preferably cut from Jersey cloth, cotton, flannel or other suitable material.

The present glove embodies a main or body blank 1, comprising the symmetrical side or palm sections 2, said sections 2 being symmetrical at the opposite sides of the median line 3 of the blank 1. The side or palm sections 2 are provided with integral index, third and fourth finger pocket sections 4, 5 and 6 respectively, the finger pocket sections 4 being attached to the median line of the blank, and the respective finger sections 4, 5 and 6 being separated by slits or cuts extending to the palm sections proper.

The adjacent slits between the finger sections 4 and 5 extend beyond the butt or basal portions of the finger sections, as at 7, or extend into the palm sections proper in order that the blank may be opened or spread at these points to provide space for receiving the second finger portions, it being apparent that as the hand spreads in a fan shape, the original blank may be cut on practically parallel lines and that when the blank is spread and the second finger members inserted the completed blank will provide the proper enlargement for the knuckle and finger portions of the glove. The finger sections are preferably provided with the V-shaped notches 8 at their butt portions adjoining the slits between the said finger sections. The said notches 8 serve to distinguish the main portions of the slits between the finger sections 4 and 5, and the extended portions of the slits, the extended portions of the slits being employed for the attachment of the second finger pocket sections as will hereinafter appear, and the V-shaped notches serving as starting points or guides for the person sewing the second finger blanks in place.

The blank 1 is provided at its lower end adjoining its wrist portion with an ovate-acuminate slit or cut 9, which forms a thumb opening or seat and a thumb lap 10 of ovate-acuminate contour. The blank is also provided with a short slit or cut 11 extending from the intermediate portion of the slit 9, or from the tip of the thumb lap 10 to the respective end of the blank 1, to divide or separate the lower ends of the wrist portions of the side or palm sections of the blank.

The thumb pocket blank 12 embodies the two sections 13, which are approximately of ovate-acuminate contour which are integral and disposed at an obtuse angle with respect to one another.

The second or independent finger pocket is constructed of two sections 14, in a manner which will be described hereinafter. The lining or facing for the index finger pocket comprises a blank 15, which is provided at its lower end with a crotch 16.

The side edges of the blank 1, or the remote edges of the palm sections 2 and finger pocket sections 6, are curved outwardly, as at $6^a$, for the purpose which will hereinafter appear.

In assembling the parts of the glove, the side edges of the lining blank 15 are sewed to the inner sides of the palm sections 2 and the index finger sections 4, by the lines of stitches 17, the inner edges of the crotch 16 being disposed flush with the edges of the thumb opening of the blank 1. The edges 13′, of the sections 13 of the thumb pocket blank are then stitched to the edges of the thumb opening, together with the inner edges of the crotch 16 of the index finger lining or facing 15, by a line of stitches 18, the blanks 12 and 15 being disposed upon opposite sides of the blank 1. The thumb lap or facing 10 projects from between the blanks 15 and 12, when the said blanks are secured or stitched to the blank 1, and the thumb lap or facing 10 and the blank 12 are then brought together, so that the edges of the thumb lap or facing 10 may be sewed to the inner sides of the sections 13 by a line of stitches 19.

To attach the finger sections 14, the finger sections 4 and 5 of the blank 1 are spread or swung apart as illustrated in Fig. VII, whereby the inner ends of the slits between the finger sections 4 and 5 will be opened. The finger sections 14 are then laid upon the proper side of the blank 1 with their butt ends disposed along the edges formed by the extended portions of the said slits, the said edges then being stitched to the butt ends of the sections 14 by the lines of stitches 20, the corner of each finger section being placed at a corner of one of its V-notches 8 when the stitching is started, in order to properly locate the finger blanks, and insure a proper finished combination of the finger blank and body blank, and combination of the inserted finger with those integral with the body of the glove. When the finger sections 4 and 5 of the blank 1 are spread or swung apart, the inner ends or extended portions of the slits between the said sections will be opened, whereby the edges defined by the said portions of the slits will approximately aline, so that when the independent finger sections 14 are stitched to the said edges defined by the extended portions of the slits, and when the finger sections 14 are stitched together, the finger sections 4 and 5 will be crowded apart and will be disposed angularly with respect to one another as seen in Figs. VII and VIII, instead of parallel. Then the fingers of the hand will be readily accommodated by the finger pockets, it being observed that the material from which the glove or mitten is formed, is sufficiently elastic or flexible to permit the finger sections 14 to be applied, as stated. The finger sections 14 thus being interposed between the finger sections 4 and 5 of the blank 1 are swung outwardly and the glove or mitten is completed by stitching the respective edges of the palm section thumb and finger sections together, as is well understood in the art. The curved portions or flaps $6^a$ may be stitched together along various lines in order to adjust the width of the glove. Thus, after the portions $6^a$ have been stitched together, the user, if he so desires, may rip the portions $6^a$ apart, in order that they may be restitched in such a manner as to properly fit the wearer's hand. The glove being thus completed will carry out the objects aimed at in a highly efficient and desirable manner, it being observed that the second finger being interposed in the manner described will cause the finger pockets to be spread sufficiently apart to comfortably accommodate the fingers. In this manner, the usual flat condition of the glove or mitten is avoided, this flat condition of the glove or mitten being usually present in reversible gloves or mittens. Attention is also directed to the fact that the lining or facing of the index finger pocket and the thumb lap or facing, in forming the lining or facing of the thumb, will protect those portions of the glove, which are subject to the greatest amount of wear when the glove is employed for handling various articles.

Referring to Fig. IX, it will be noted that the blanks 1, 12 and 15 and the thumb lap or facing 10 of the blank 1 being stitched together in the peculiar manner described will provide a quirk seam of four-ply thickness, it being noted that the edge of the blank 12 is stitched to the blank 1 and is turned under, while the edge of the crotch 16 is turned under the thumb pocket blank 12, together with the thumb lap or facing 10 so as to provide a protected and reinforced seam.

It is to be noted that the edges of the finger pocket sections being stitched together, will locate the seams between the finger pockets, in order that the seams will be protected from wear, or will be as little exposed as is possible. It is also evident, that as illustrated in Fig. IX the independent finger pocket sections 14 may be stitched to the body blank in a convenient manner, by separating the finger pocket sections 4 and 5, the stitch lines 20 being practically straight, due to the opening up of the inner portions of the slits between the sections 4 and 5.

The glove may be provided with an elastic gauntlet band or wrist 21, although the wrist is well known in the art and may be eliminated if desired.

In the construction of the glove, it must be observed that after several blanks have been sewed together, the blank 1 is then doubled or folded upon the median line 3 to bring the side or palm sections 4 and the finger sections into coincidence. The said glove being of the reversible type, may be worn on either the right or left hand.

Having thus described my invention, what I claim as new therein, and desire to secure by Letters-Patent, is:—

1. In a glove, a body blank, slits at one end defining three finger portions, a slit between two adjacent finger portions being extended beyond the base portions thereof and into the palm portions of the blank and the said adjacent finger portions having notches at the finger base portions separating the finger and extended portions of the slit, and a separate finger blank stitched to the body blank at the edges of the extended slit with the inner corners of the finger blank terminating at the notches in the adjacent finger portions.

2. In a glove, a body blank comprising front and back members, each slit to form three relative finger portions, the slits between relative, adjacent finger portions on the front and back members being extended into the palm and back portions of the blank and said adjacent finger portions having notches at the finger base portions separating the finger and extended portions of the slits, separate finger blanks stitched to the palm and back portions of the body blank at the edges of the extended slits and adapted for registration when the palm and back members are folded onto each other to provide a finger pocket.

3. A glove or mitten comprising a body having a thumb opening and a thumb lap, an index finger lining stitched to the body and having its lower end disposed flush with the edges of the thumb opening, and a thumb pocket blank having certain of its edges disposed flush with the thumb opening, said edges of the thumb pocket blank and the lower end of the said lining being stitched to the body with the thumb lap projecting from between the said lining and the thumb pocket blank, and the thumb lap having its edges stitched to the thumb pocket blank, the said edges of the thumb pocket blank being turned under adjacent the quirk.

In testimony whereof, I affix my signature in presence of two witnesses.

EDWIN T. BASKIN.

Witnesses:
LYNN A. ROBINSON,
LETA E. COATS.

Copies of this patent may be obtained for five cents each, by addressing the "Commissioner of Patents, Washington, D. C."